United States Patent [19]

Anstee

[11] Patent Number: 4,871,953
[45] Date of Patent: Oct. 3, 1989

[54] REARVIEW MIRROR FOR A MOTOR VEHICLE

[75] Inventor: Christopher J. Anstee, Chichester, England

[73] Assignee: Britax Wingard Limited, England

[21] Appl. No.: 127,224

[22] Filed: Dec. 1, 1987

[30] Foreign Application Priority Data

Dec. 13, 1986 [GB] United Kingdom ............... 8629826

[51] Int. Cl.$^4$ ............................................. H02P 1/54
[52] U.S. Cl. ...................................... 318/466; 318/51; 318/53
[58] Field of Search ............... 318/466, 467, 468, 470, 318/51, 53; 307/10 R; 350/605, 606, 636, 637

[56] References Cited

U.S. PATENT DOCUMENTS

| | | |
|---|---|---|
| 3,864,578 | 4/1975 | Lackey . |
| 4,678,295 | 7/1987 | Fisher ................................. 350/634 |
| 4,682,088 | 7/1987 | Sullivan ......................... 318/466 X |
| 4,689,537 | 8/1987 | Mizuta et al. ................... 318/466 X |
| 4,698,571 | 10/1987 | Mizuta et al. ................... 318/466 X |
| 4,707,788 | 11/1987 | Tashiro et al. .................. 318/466 X |
| 4,727,302 | 2/1988 | Mizuta et al. ................... 318/466 X |

FOREIGN PATENT DOCUMENTS 0190697 8/1986 European Pat. Off. .
0216372 4/1987 European Pat. Off. .
3311229 10/1984 Fed. Rep. of Germany .

Primary Examiner—Bentsu Ro
Attorney, Agent, or Firm—Davis, Bujold & Streck

[57] ABSTRACT

A rear-view mirror system for a motor vehicle comprises a mirror housing, a reflective member mounted in the housing, electrically operated drive means for varying the orientation of the reflective member, a position sensor for producing a signal indicating the actual position of the reflective member, and a data processor comprising means for storing a value indicating a preselected orientation for the reflective member and means for comparing said value with the signal from the position sensor and producing a control signal for the drive means. The data processor includes a decoder and is located in the housing and is connected to an encoder at a central location, the encoder being arranged to send a multiplicity of data signals to the processor on a common data transmission line.

4 Claims, 2 Drawing Sheets

REARVIEW MIRROR FOR A MOTOR VEHICLE

BACKGROUND OF THE INVENTION

1. Field of the Invention

This invention relates to a rear-view mirror system for a motor vehicle comprising a mirror housing, a reflective member mounted in the housing, electrically operated drive means for varying the orientation of the reflective member, a position sensor for producing a signal indicating the actual position of the reflective member, and a data processor comprising means for storing a value indicating a pre-selected orientation for the reflective member and means for comparing said value with the signal from the position sensor and producing a control signal for the drive means.

2. Description of the Prior Art

Patent Specification EP-A-0230203 discloses a system of this type in which electrical signals indicating the position of a controlled member are sent to a computer at a central location on the vehicle which compares these signals with the corresponding values which would be obtained if the controlled member was at a desired position and which can be actuated to generate control signals which cause the drive means to drive the controlled member to such desired position. Consequently, sufficient data must be transmitted from the location of the controlled member to the centrally located computer to indicate the position of the controlled member to the accuracy with which its position is to be set. The object of the present invention is to reduce the amount of data which has to be transmitted.

SUMMARY OF THE INVENTION

According to the invention, in a rear-view mirror system of the foregoing type, the data processor includes a decoder and is located in the housing and is connected to an encoder at a central location, the encoder being arranged to send a multiplicity of data signals to the processor on a common data transmission line.

BRIEF DESCRIPTION OF THE DRAWINGS

An embodiment of the invention will now be described, by way of example, with reference to the accompanying drawing, in which.

DESCRIPTION OF THE PREFERRED EMBODIMENT

In this embodiment of the invention, the two door mirrors are of the type in which electric motors are arranged to vary the orientation of the reflective member relative to the housing. However, the invention could equally be applied to mirrors in which electric motors are arranged to vary the orientation of the entire housing relative to the vehicle body.

Figure 1:
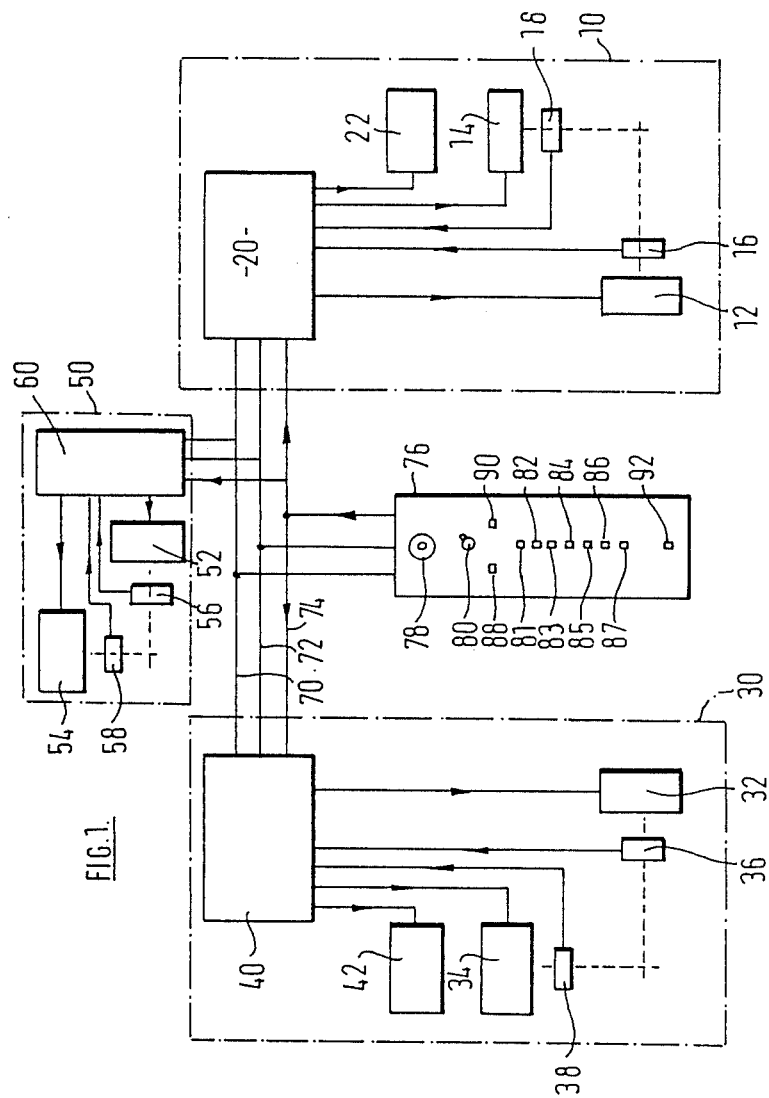
FIG. 1 is a block diagram of a control system for the interior mirror and the left-hand and right-hand door mirrors of a motor car.

Referring to FIG. 1, the housing 10 of the left-hand door mirror encloses two electric motors 12 and 14 arranged to vary the orientation of the reflective member (not shown) about horizontal and vertical axis respectively. Each of the motors 12 and 14 is also coupled to drive a respective potentiometer 16, 18 which is arranged to provide an analogue voltage indicating the orientation of the reflective member about the corresponding axis. The two potentiometers 16 and 18 are connected to respective analogue inputs of a processor 20, the processor 20 also has first and second power outputs which can supply energising voltages of either polarity to the motors 12 and 14 respectively to cause rotation thereof in either direction, together with a single polarity output which is connected to a heater 22 for demisting and/or defrosting the reflective member.

The left-hand mirror 30 is similar, having two electric motors 32 and 34 coupled to respective potentiometers 36 and 38, a processor 40 and a heater 42. The interior mirror 50 also has two electric motors 52 and 54 coupled to respective potentiometers 56 and 58, and a processor 60, but it does not have a heater.

All three mirrors 10, 30 and 50 are connected by positive and negative power supply conductors 70 and 72 and a data conductor 74 to a central control unit 76 which is mounted at some central rotation in the vehicle where it is conveniently accessible to the driver. The central control unit 76 has a number of manually operable controls, namely a joystick 78 for varying the orientation of the mirrors, a three-position selector switch 80 for selecting the mirror whose orientation is to be varied in response to movement of the joystick 78, seven memory-select push-button switches 81 to 87 for controlling the setting of the orientation of the mirrors to the orientations preferred by each of seven different habitual users of the vehicle (hereinafter designated Driver A to Driver G respectively), push-button "heater on" and "heater off" switches 88 and 90 for turning the heaters 22 and 42 on and off respectively, and a push-button "store" switch 92 the purpose of which will become apparent from the following description of the manner in which the invention operates.

When it is desired to vary the orientation of the right-hand mirror 10, the selector switch 80 is set to the right-hand position. Upward and downward movement of the joystick 78 then controls the motor 12 to vary the orientation of the reflective member about its horizontal axis while leftward and rightward movement controls the motor 14 to vary the orientation of the reflective member about its vertical axis. When the required orientation is achieved, the joystick 78 is restored to its central position. The procedure can then be repeated for the left-hand door mirror 30 with the selector switch 80 in its left-hand position, and for the interior mirror 50 with the selector switch 80 in its central position. If Driver A wishes to store these orientations as his preferred orientations, he first presses the "store" switch 92 and then presses his memory-select switch 81. Similarly, Drivers B to G can arrange to store their preferred orientations by repeating the foregoing procedure but pressing the appropriate memory-select switch 82 to 87 to store the predetermined orientations. If, subsequently, any of the seven drivers wishes to set the mirrors to the orientations which he prefers, he merely presses the appropriate one of the memory-select switches 81 to 87.

The central control unit 76 sends data signals to the data conductor 74 in accordance with the following five-bit code:

| | |
|---|---|
| 00000 | no action |
| 00001 | heaters off |
| 00010 | heaters on |
| 00011 | |

| | |
|---|---|
| 00100 | left mirror up |
| 00101 | left mirror down |
| 00110 | left mirror left |
| 00111 | left mirror right |
| 01000 | right mirror up |
| 01001 | right mirror down |
| 01010 | right mirror left |
| 01011 | right mirror right |
| 01100 | interior mirror up |
| 01101 | interior mirror down |
| 01110 | interior mirror left |
| 01111 | interior mirror right |
| 10000 | |
| 10001 | |
| 10010 | |
| 10011 | |
| 10100 | |
| 10101 | |
| 10110 | |
| 10111 | |
| 11000 | memory A |
| 11001 | memory B |
| 11010 | memory C |
| 11011 | memory D |
| 11100 | memory E |
| 11101 | memory F |
| 11110 | memory G |
| 11111 | store |

Figure 2:
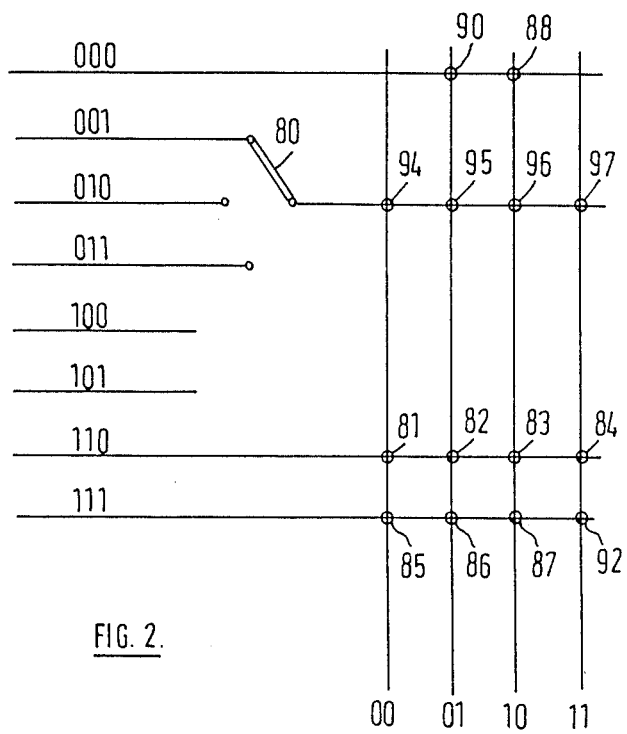
FIG. 2 is a schematic diagram of a switching matrix for the system shown in FIG. 1.

FIG. 2 shows the switch matrix of the control unit 76. In the orientation illustrated, the matrix consists of four vertical conductors, each of which is associated with a respective combination of the two least significant digits of the code, and four horizontal conductors, three of which are associated with the combinations 000, 110 and 111 of the three most significant digits of the code. The fourth horizontal conductor is selectively connectable, by the three-position switch 80 to any of three inputs associated with the combinations 001, 010 and 011 of the theree most significant digits of the code. The two inputs for the combinations 100 and 101 are not used in the embodiment illustrated.

The appropriate code signal is applied to the conductor 74 (FIG. 1) when one of the vertical conductors of the matrix is connected to one of the horizontal conductors. If a second pair of conductors is so connected before the pair has been disconnected, the code of the first connected pair continues to be sent. Each of the switches 81 to 90 is connected between the appropriate pair of conductors. "Up", "down", "left" and "right" movements of the joystick 78 is arranged to cause actuation of a respective one of four further switches 94, 95, 96 and 97 which connect respective vertical conductors to the three-position switch 80.

Each of the processors 20 and 40 in the mirror housings detects all of the control signals and, in response to the appropriate signals, controls operation of the two motors and the heater therein. The relevant action continues until the code from the central control unit 76 changes.

As a precaution against inadvertent storage of an undesired value, the code 11111 produced by the "store" switch 92 is preferably arranged to disable the various motors until after another code (except 00000) has been received. Any such following code not beginning with the digits 11 is treated as invalid and cancels the store operation. If the following code is in the range 11000 to 11110, the current settings are stored in the appropriate section of the memories in the three mirrors 10, 30 and 50. If the following code is 11111 (because the "store" switch has been pressed twice), the system remains in the store mode. If the code 00000 persists for longer than, say, ten seconds after the code 11111, indicating that no further switch has been actuated, the store mode is cancelled.

I claim:

1. A rear-view mirror system for a motor vehicle comprising a plurality of mirror housings and an encoder at a location outside said mirror housings arranged to transmit a multiplicity of data signals, there being mounted in each mirror housing:
   a reflective member,
   electrically operated drive means for varying the orientation of the reflective member,
   a position sensor for producing a signal indicating the actual position of the reflective member, and
   a data processor comprising storage means for storing a value indicating a pre-selected orientation for the reflective member in said housing, means for comparing said value with the signal from the position sensor and producing a control signal for the drive means, and a decoder responsive to said encoder.

2. A mirror system according to claim 1, wherein the storage means comprises means for storing a plurality of values, each of which indicates a respective preselected location of said reflective member, and the processor is arranged to respond to data signals from the encoder either to store a value corresponding to the signal from the position sensor or to compare the signal from the position sensor with a previously stored value.

3. A mirror system according to claim 2, wherein the processor is arranged to respond to data signals from the encoder to cause the drive means to move the reflective member in a direction indicated by said data signals.

4. A mirror system according to claim 1, wherein the processor is arranged to respond to data signals from the encoder to cause the drive means to move the reflective member in a direction indicated by said data signals.

* * * * *